United States Patent
Vickers (10) Patent No.: US 11,810,379 B1
(45) Date of Patent: Nov. 7, 2023

(54) SYSTEM AND METHOD FOR DETECTING AND TRANSFERRING SENSITIVE DATA BY INFERRING CONTEXT IN UNSTRUCTURED DOMAINS

(71) Applicant: UIPCO, LLC, San Antonio, TX (US)

(72) Inventor: Darryl Trent Vickers, Lytle, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 646 days.

(21) Appl. No.: 16/914,581

(22) Filed: Jun. 29, 2020

(51) Int. Cl.
  G06F 40/284 (2020.01)
  G06V 30/41 (2022.01)
  G06F 21/62 (2013.01)
  G06F 40/253 (2020.01)
  G06F 18/22 (2023.01)

(52) U.S. Cl.
  CPC .......... *G06V 30/41* (2022.01); *G06F 18/22* (2023.01); *G06F 21/6245* (2013.01); *G06F 40/253* (2020.01); *G06F 40/284* (2020.01)

(58) Field of Classification Search
  None
  See application file for complete search history.

(56) References Cited

U.S. PATENT DOCUMENTS

| | | | |
|---|---|---|---|
| 7,181,438 B1* | 2/2007 | Szabo | G06Q 30/0212 705/14.27 |
| 9,465,942 B1* | 10/2016 | Kane-Parry | G06F 21/125 |
| 10,762,438 B1* | 9/2020 | Zhang | G06F 40/35 |
| 2007/0162749 A1* | 7/2007 | Lim | G06F 21/6227 713/167 |
| 2011/0040983 A1* | 2/2011 | Grzymala-Busse | G06F 21/6245 713/189 |
| 2020/0082272 A1* | 3/2020 | Gu | G06F 21/6245 |
| 2020/0250139 A1* | 8/2020 | Muffat | G06V 30/274 |
| 2020/0311414 A1* | 10/2020 | Enuka | G06F 40/205 |

* cited by examiner

*Primary Examiner* — Ariel Mercado
(74) *Attorney, Agent, or Firm* — Plumsea Law Group, LLC (57) ABSTRACT

The embodiments provide a system and method for detecting sensitive data in one or more documents, which may be housed in a data storage system. More specifically, the embodiments provide a system that can not only identify potentially sensitive data based on pattern matching, but which can also infer context in unstructured domains. Context may be inferred using both part of speech analysis and by analyzing the similarity of potentially sensitive data with key terms using a vector space model.

20 Claims, 7 Drawing Sheets

| 710 | TF-IDF WEIGHTS FOR TERMS IN EACH DOCUMENT | | | | |
|---|---|---|---|---|---|
| | DOCUMENT 1 | DOCUMENT 2 | DOCUMENT 3 | ... | DOCUMENT N |
| POTENTIALLY SENSITIVE TERM | 100 | 0 | 34 | ... | 21 |
| KEY TERM 1 | 50 | 15 | 9 | ... | 1 |
| KEY TERM 2 | 10 | 0 | 0 | ... | 0 |
| KEY TERM 3 | 31 | 4 | 0 | ... | 7 |
| ... | ... | ... | ... | ... | ... |
| KEY TERM N | 247 | 39 | 11 | ... | 106 |

SYSTEM AND METHOD FOR DETECTING AND TRANSFERRING SENSITIVE DATA BY INFERRING CONTEXT IN UNSTRUCTURED DOMAINS

TECHNICAL FIELD

The present disclosure generally relates to data security, and specifically to detecting sensitive data in documents.

BACKGROUND

Sensitive Data Management (SDM) has become an important area of data management, with the near constant reporting of data breaches and inadvertent exposure of personal and financial information. The methods and technologies being used to counter these critical issues have not kept pace with the explosion of data housed and maintained in countless datacenters and cloud providers. The major problem with existing technologies is the over dependence on rudimentary pattern matching for identification of sensitive data. Relying exclusively on patterns alone creates the issue of very high false positive readings. This can lead to data saturation, where the volume of potential findings becomes so large and polluted with suspect false readings that the data in effect becomes useless. To avoid too many false positives, many systems use overly narrow patterns, thereby allowing true positives to pass undetected.

There is a need in the art for a system and method that addresses the shortcomings discussed above.

SUMMARY

In one aspect, a method of detecting sensitive data in a set of documents include a step of scanning the set of documents, using a pattern matching module, for data elements that have a predetermined data pattern. The method also includes steps of identifying a matching data element in at least one document of the set of documents, using a part of speech module to determine a part of speech label for the matching data element, and determining a part of speech score, where a value of the part of speech score depends on the part of speech label. The method also includes steps of determining a sensitive data score using at least the part of speech score, retrieving a threshold score, identifying the matching data element as comprising sensitive data if the sensitive data score is greater than or equal to the threshold score, and taking a mitigating action when the matching data element comprises sensitive data.

In another aspect, a method of detecting sensitive data in a set of documents includes steps of scanning the set of documents, using a pattern matching module, for data elements that have a predetermined data pattern, identifying a matching data element in at least one document of the set of documents, and retrieving at least one key term, where the at least one key term is a term associated with documents including sensitive data. The method also includes steps of using a vector space model to represent the matching data element as a first vector and to represent the at least one key term as a second vector, calculating a difference between the first vector and the second vector, determining a vector similarity score using the calculated difference between the first vector and the second vector, determining a sensitive data score using at least the vector similarity score, retrieving a threshold score, identifying the matching data element as comprising sensitive data if the sensitive data score is greater than or equal to the threshold score, and taking a mitigating action when the matching data element comprises sensitive data.

In another aspect, a method of detecting sensitive data in a set of documents includes steps of scanning the set of documents, using a pattern matching module, for data elements that have a predetermined data pattern, identifying a matching data element in at least one document of the set of documents, using a part of speech module to determine a part of speech label for the matching data element, determining a part of speech score, wherein a value of the part of speech score depends on the part of speech label, and retrieving at least one key term, where the at least one key term is a term associated with documents including sensitive data. The method also includes steps of using a vector space model to represent the matching data element as a first vector and to represent the at least one key term as a second vector, calculating a difference between the first vector and the second vector, determining a vector similarity score using the calculated difference between the first vector and the second vector, determining a sensitive data score using the part of speech score and the vector similarity score, retrieving a threshold score, identifying the matching data element as comprising sensitive data if the sensitive data score is greater than or equal to the threshold score, and taking a mitigating action when the matching data element comprises sensitive data.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments provide a system and method for detecting sensitive data in one or more documents, which may be housed in a data storage system. More specifically, the embodiments provide a system that can not only identify potentially sensitive data based on pattern matching, but which can also infer context in unstructured domains. By combining this context with pattern matching, the system can identify sensitive data with a higher degree of accuracy than conventional systems. This reduces the number of positives that are missed (resulting in false negatives), thereby reducing costs of mitigating data breaches for both organizations and individuals whose personal data might otherwise be exposed. The system also improves computational efficiency for the entire sensitive data management process, by reducing the time and processing power required to review millions or billions of documents that are unnecessarily flagged as containing potentially sensitive information by current systems that produce too many false positives.

Figure 1:
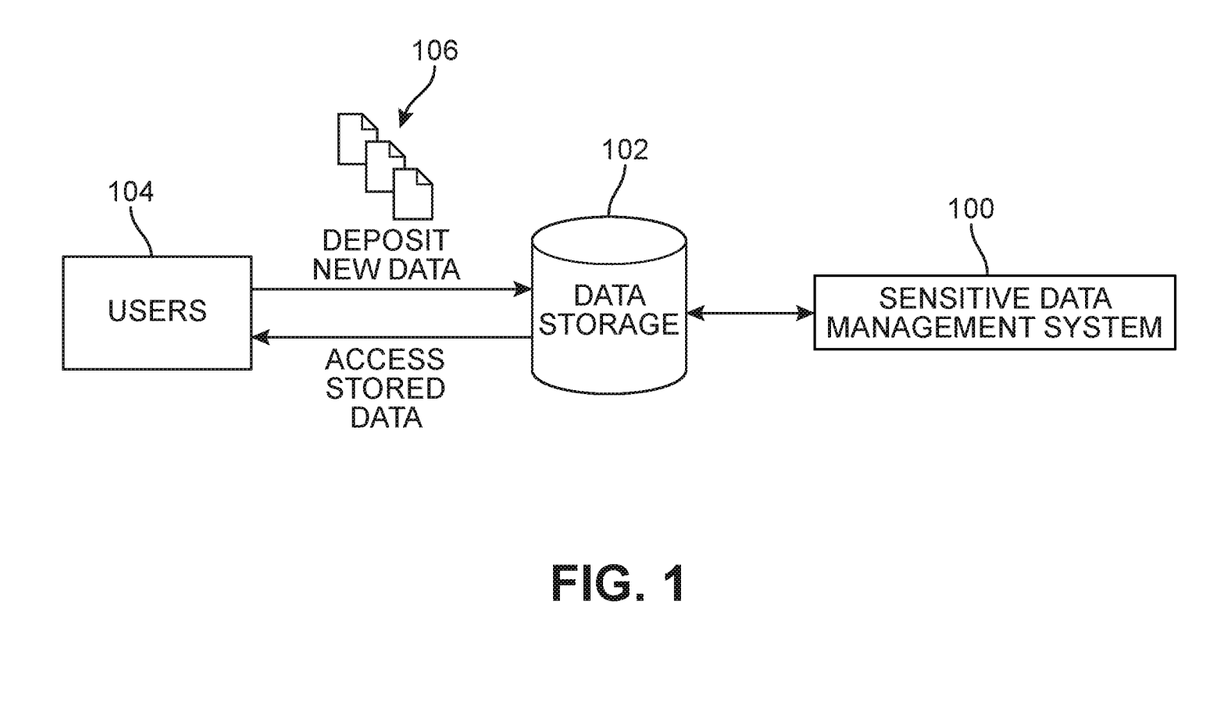
FIG. 1 is a schematic view of a sensitive data management system that can manage data in a data storage system, according to an embodiment.

FIG. 1 is a schematic view of a sensitive data management system 100 that is configured to manage data in data storage system 102. Data storage system 102 could be any kind of data storage system, including, but not limited to: a database, a data warehouse, a data center, a data lake, or any other suitable data storage system. Data storage system 102 may include structured data (such as database tables) or unstructured data. Users 104 may also access data storage system 102. Depending on permissions, users 104 may deposit new data (such as documents 106), access stored data, and/or modify existing data.

In some embodiments, sensitive data management system 100 may be used to detect potentially sensitive information in any documents, tables, or other types of data that are stored in data storage system 102. In some embodiments, sensitive data management system 100 may also be configured to perform mitigating actions when sensitive information is detected. Such actions may include quarantining documents, sending updates to the author/owner of the data with sensitive information, and following up with an author/owner to confirm the sensitive data has been removed, encrypted, or otherwise handled in a suitable manner.

Figure 2:
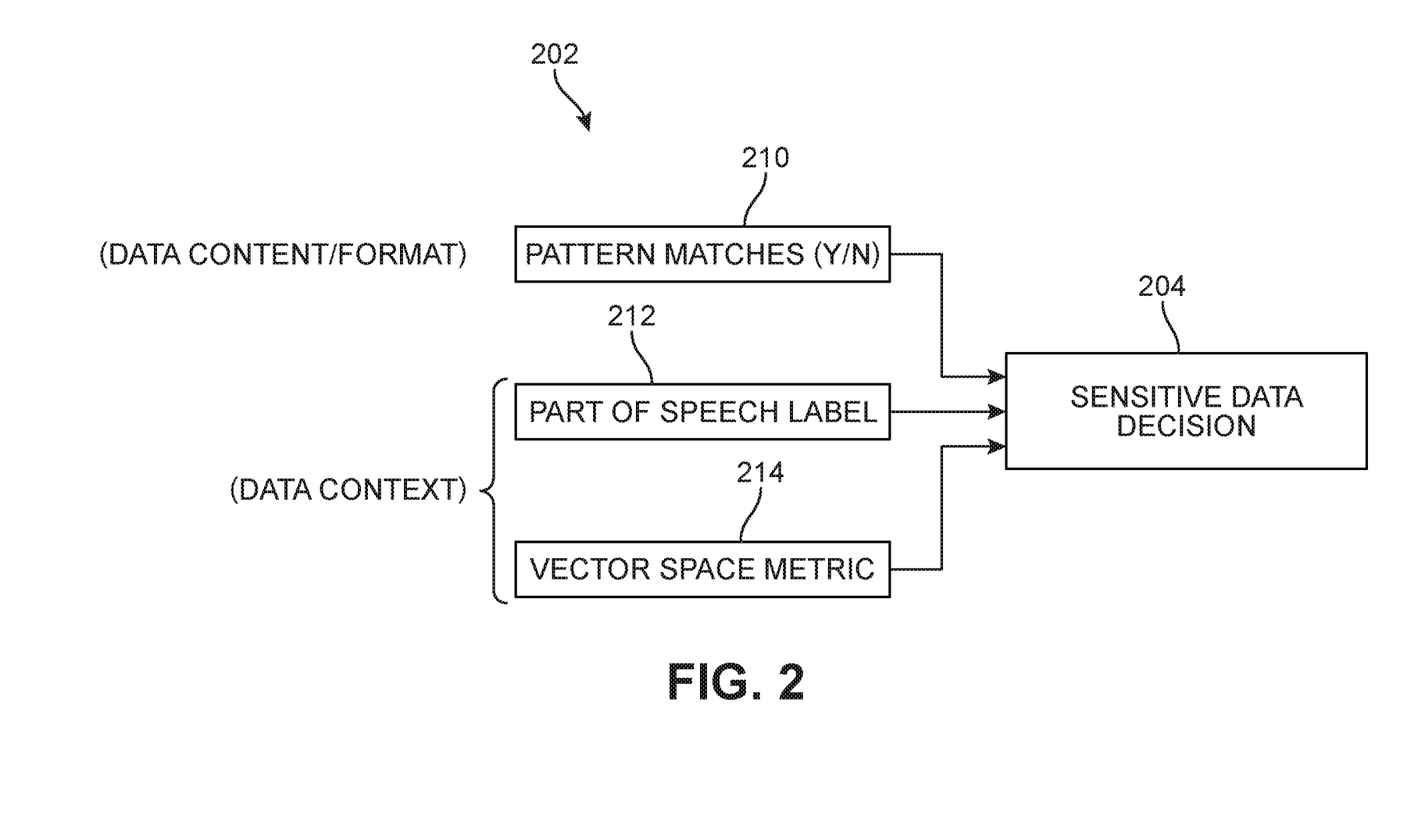
FIG. 2 is a schematic view of a set of factors influencing a sensitive data decision, according to an embodiment.

FIG. 2 is a schematic view indicating the kinds of information, or factors, that may be used by sensitive data management system 100 to identify potentially sensitive information with a high degree of accuracy. Thus, FIG. 2 includes both a set of influencing factors 202 (or inputs) and a sensitive data decision process 204. In some cases, the output of this decision process may be a binary value indicating whether or not the data includes sensitive information. In other cases, the output of this decision process may be a number representing a probability that the data includes sensitive information, such as a number between 0 and 1, or a number between 0 percent and 100 percent.

As seen in FIG. 2, a first input 210 includes pattern matching information. In some cases, first input 210 may comprise a binary value indicating if a selected data element matches a predetermined pattern for some kind of sensitive information (such as a social security number). As indicated in FIG. 2, first input 210 represents the explicit content and formatting of the data. Such information may include the number of characters, the type of characters (alphabetical or numeric), the presence of special characters (such as dashes, dollar signs, or periods), or other suitable content and formatting information.

As previously discussed, using only pattern matching to identify data elements with particular content and/or formatting may lead to inaccurate results (such as too many false positives or too many false negatives). Whether or not a given pattern of characters comprises sensitive data may depend on the context in addition to the content and formatting. For example, a nine-digit number could be a sequence number, a dollar value, or a Social Security Number. A system relying only on pattern matching to identify sensitive data may misidentify a nine-digit sequence number as a Social Security Number, resulting in a false positive. Alternatively, a system tuned to only identify Social Security Number data in the format "XXX-XXX-XXXX", including explicit use of dashes, may miss Social Security Numbers formatted without dashes. Instead of relying solely on pattern matching, the exemplary embodiments use pattern matching in combination with context information for the data.

In the exemplary embodiment, data context may be provided using a part of speech label 212 and using a vector space metric 214. As used herein, a part of speech label refers to a label intended to indicate the grammatical part of speech that a word serves in a phrase or sentence. Examples of parts of speech include, but are not limited to: noun, verb, adjective, adverb, pronoun, preposition, conjunction, interjection, numeral, article, or determiner. Thus, for example, part of speech label 212 may have a value of "noun" or "adverb". As described in further detail below, the part of speech of a given term depends on its relation to adjacent terms (such as words in the same phrase or sentence). In some cases, the part of speech label could characterize a word as comprising a subject, which comprises a broader category of part of speech labels that includes both nouns and pronouns.

Vector space metric 214 may be determined in conjunction with a vector space model. As used herein, the term "vector space model" refers to an algebraic model for representing text as vectors. More specifically, each vector could be representative of a single term (such as a word), a search query (or string of words), a document, or a collection of documents. The term "vector space metric" refers to any measure of distance or similarity between two vectors in a vector space model. Examples of vector space metrics include Euclidean distance and cosine distance.

Figure 3:
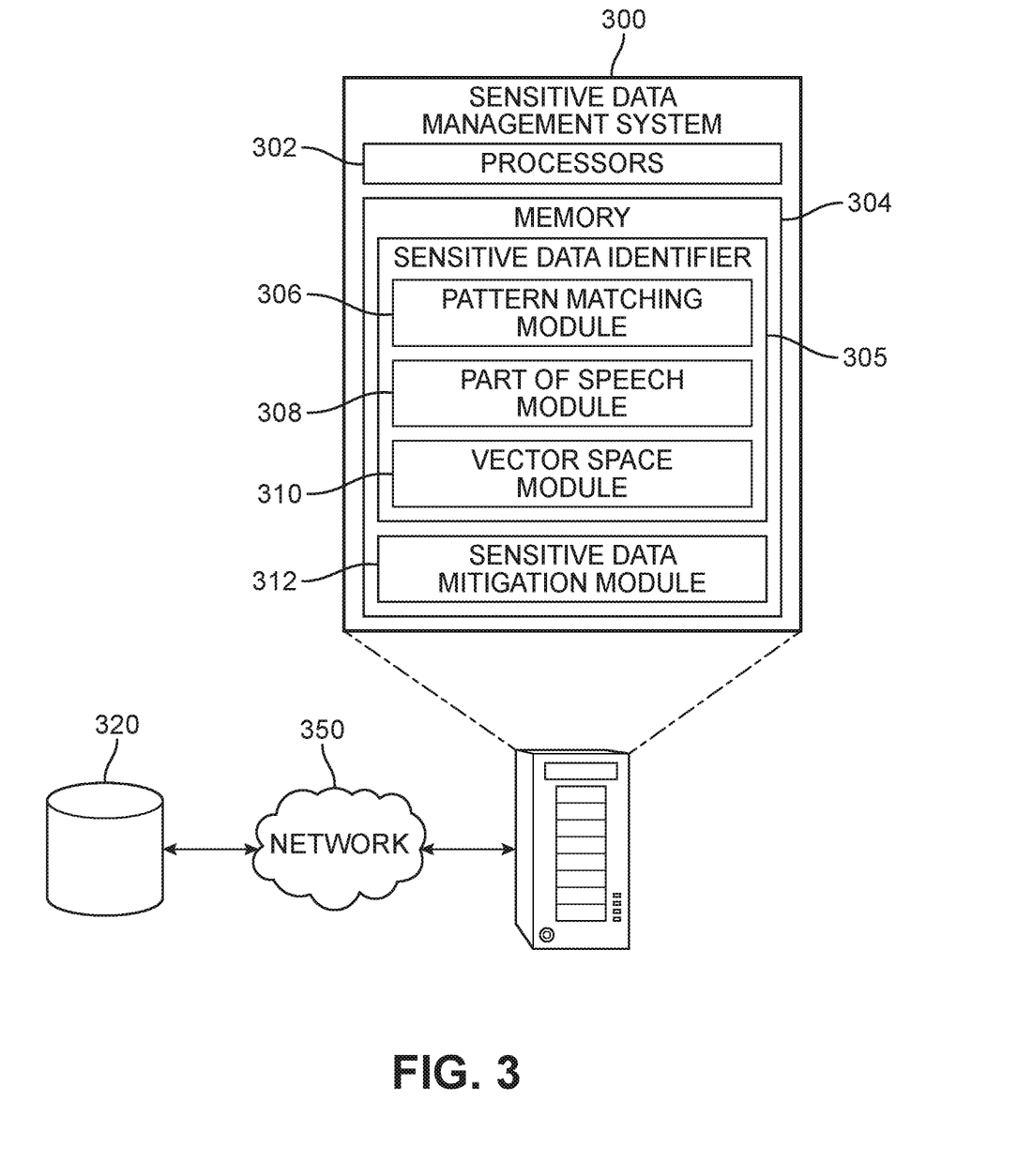
FIG. 3 is a schematic view of a sensitive data management system, including various modules, according to an embodiment.

FIG. 3 is a schematic view of a sensitive data management system 300. Sensitive data management system 300, also referred to simply as data management system (DMS) 300, comprises various hardware and software components to facilitate identifying potentially sensitive data within a data storage system 320. In the exemplary embodiment, DMS 300 may comprise a server, or allocated resources on a server, however in other embodiments DMS 300 could be configured as any other kind of suitable computing system. DMS 300 may comprise processors 302 and memory 304. Memory 304 may comprise a non-transitory computer readable medium. Instructions stored within memory 304 may be executed by the one or more processors 302.

DMS 300 may include sensitive data identifier 305, which may comprise various software modules for detecting sensitive data in a data storage system. In the embodiment of FIG. 3, identifier 305 further includes a pattern matching module 306, a part of speech module 308, and a vector space module 310.

Pattern matching module 306 may be configured to search for known sensitive data patterns. For example, pattern matching module 306 could perform a scan on documents in data storage system 320 and look for data elements that match one or more known sensitive data patterns. One example of a sensitive data patterns includes expected patterns for social security numbers, such as nine-digit sequences arranged as "XXX-XXX-XXXX". Another example of a sensitive data pattern is an expected pattern for a credit card number, such as a string of fifteen or sixteen numbers, which may include a check digit. Still another example of a sensitive data pattern includes data formatted as an address, which could include personally identifiable information. In some cases, pattern matching module 306 may use queries to search for data elements in documents that match one or more predefined patterns. In some cases, the queries may comprise regular expressions that can be matched to elements in one or more documents, tables, or other data sources.

Any data that matches one or more predetermined sensitive data patterns can be passed along to one or both of part of speech module 308 and vector space module 310. Part of Speech Module 308 may be configured to identify the part of speech of a selected term. Because part of speech may be determined within the context of a phrase or sentence, part of speech module 308 may analyze not only the selected term that matches a predefined sensitive data pattern, but also adjacent terms, such as nearby words in a phrase or sentence. In different embodiments, the number of adjacent terms that are analyzed to provide context for the selected term may be configurable by a user of the system.

Part of speech module 308 may comprise any suitable algorithm for analyzing a phrase or sentence and assigning a part of speech to each term in the phrase or sentence. In one embodiment, part of speech module 308 could comprise a part of speech tagger, which uses both the definition of each term and its context within a phrase or sentence to assign a part of speech label. Any suitable part of speech tagger could be used, including any taggers that implement lexical tagging methods, rule-based tagging methods, probabilistic tagging methods, and deep learning tagging methods. In one embodiment, part of speech tagging could be done using a conditional random field, which is a type of discriminative probabilistic classifier.

Vector space module 310 comprises one or more algorithms for implementing a vector space model, which represents text (such as terms, documents, and/or collections of documents) as vectors in a vector space. Examples of models that implement vector space models are "word2vec" models. In one embodiment, vector space module 310 includes algorithms for encoding (or "embedding") text as vectors using term frequency-inverse document frequency (tf-idf) based weighting.

DMS 300 may also include sensitive data mitigation module 312. Sensitive data mitigation module 312 may include algorithms that facilitate taking mitigating actions once sensitive data has been identified. One exemplary a mitigating action includes notifying an author and/or owner of a set of data that has been found to include sensitive data. Another example of mitigating action includes temporarily quarantining documents in a secure location until the sensitive data is removed. In another example, documents may be encrypted so that users cannot access the data until the author/owner of the relevant documents have indicated their intent to remove the sensitive data from those documents.

DMS 300 and data storage system 320 may communicate using network 350. Any suitable network could be used, including any wide area networks and/or any local area networks.

Figure 4:
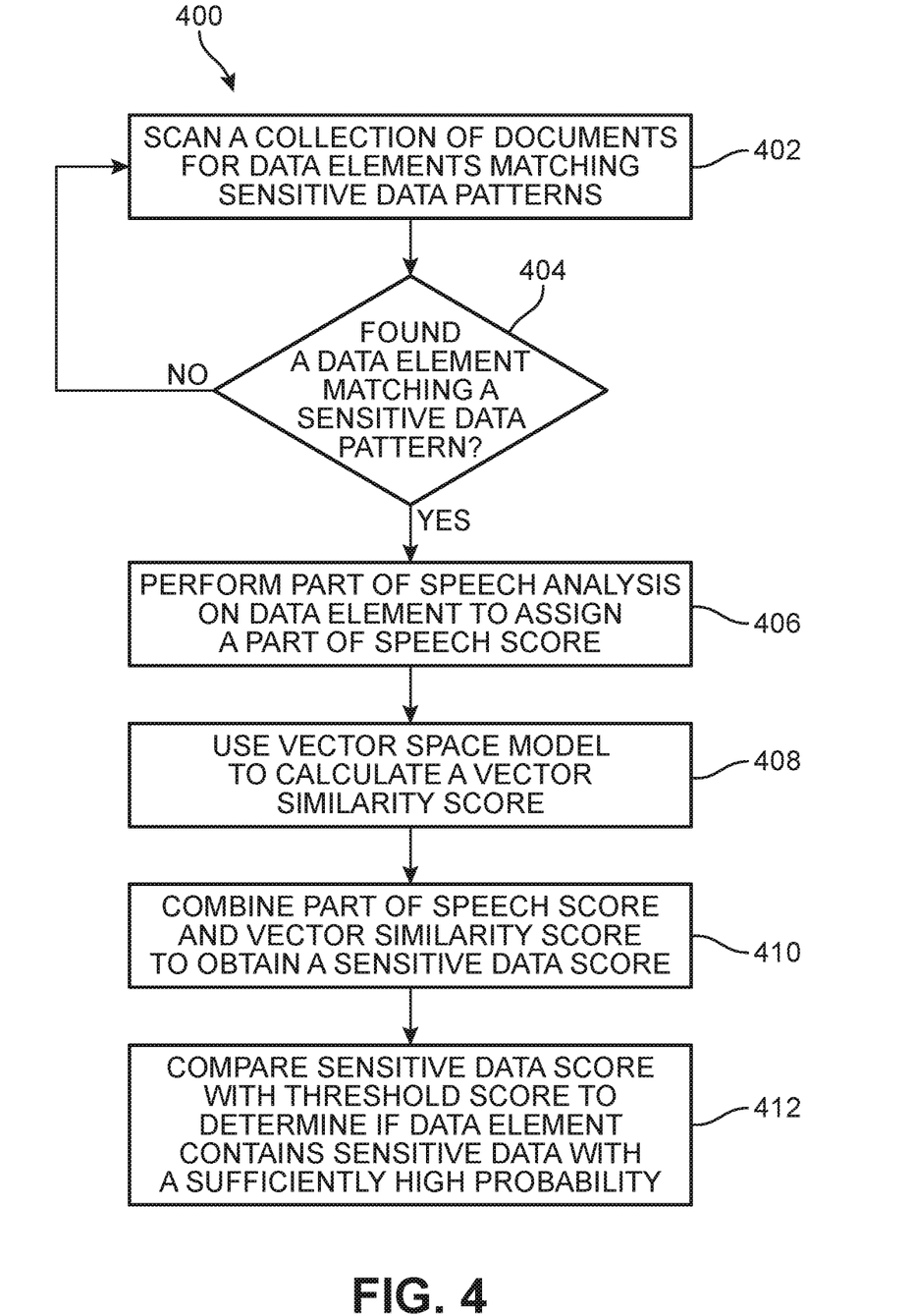
FIG. 4 is a schematic view of a process for determining if a data element may contain sensitive information, according to an embodiment.

FIG. 4 is a schematic view of a process 400 for detecting potentially sensitive data in one or more documents, tables, or other data sources. In some embodiments, some of the following steps may be performed by a sensitive data management system, such as DMS 300 of FIG. 3.

Starting in FIG. 4, DMS 300 may scan a collection of documents (or tables) for data elements that match a set of known sensitive data patterns. As used herein, the term "data element" refers to any subset of characters in a document or values in a table. A data element may include a word or group of words (such as a name or address), a sequence of alphanumeric characters, and/or any other suitable types of data. In cases where sensitive data is identified, the data element could consist only of the sensitive data or the data element could include the sensitive data as well as other kinds of data that is not sensitive.

In step 404, DMS 300 determines if a data element has been found that matches a known sensitive data pattern. If not, the system continues scanning the documents and/or tables. If a matching data element has been found, the system proceeds to step 406.

In step 406, DMS 300 may perform a part of speech analysis on the selected data element. The output of this analysis may be a part of speech score, which is described in further detail below. Next, in step 408, DMS 300 may use a vector space model to calculate a vector similarity score, which is also described in further detail below.

In step 410, the part of speech score and the vector similarity score may be combined into an overall sensitive data score. In some embodiments, the overall sensitive data score is a sum of the part of speech score and the overall sensitive data score. In some cases, one or both of the part of speech score and the overall sensitive data score may be normalized to ensure the total score does not exceed 1 (or 100%). The overall sensitive data score can then be compared against a threshold score in step 412, in order to determine if the data element contains sensitive data with a sufficiently high probability.

Figure 5:
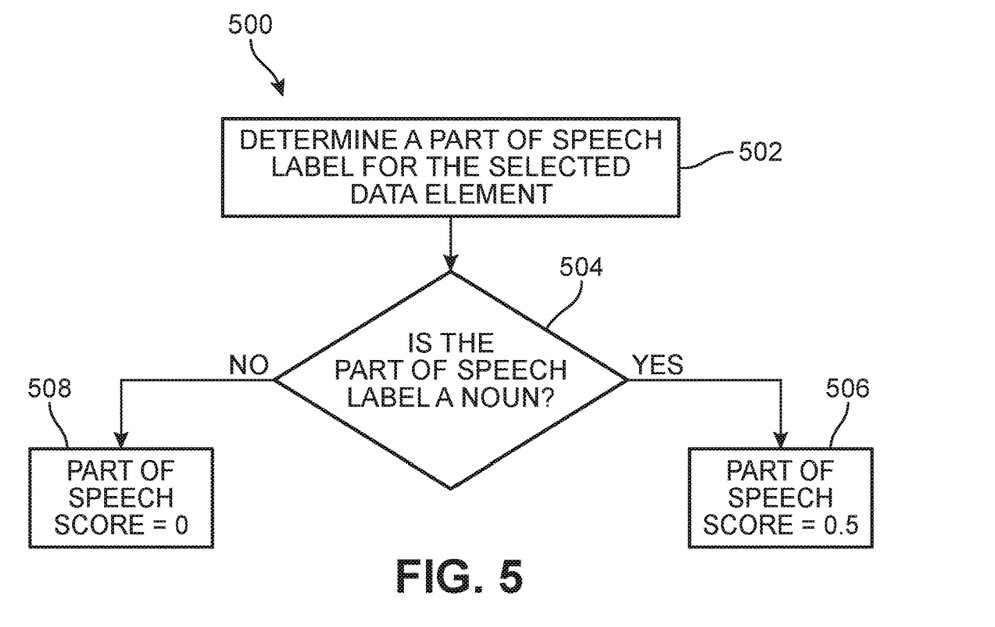
FIG. 5 is a schematic view of a process for assigning a part of speech score to a data element, according to an embodiment.

FIG. 5 is a schematic view of a process 500 for determining a part of speech score for a selected data element. In some embodiments, some of the following steps may be performed by a part of speech module, such as part of speech module 308.

Starting in step 502, part of speech module 308 may determine a part of speech label for the selected data element (or for each term in the data element if it includes multiple terms). In some embodiments, part of speech module 308 may include a part of speech tagging algorithm that can identify the part of speech of terms in a phrase or sentence. In step 504, part of speech module 308 determines if the part of speech label assigned to the data element in step 502 is a noun. If the label is a noun, part of speech module 308 may assign a value of 0.5 for the part of speech score in step 506. Otherwise, part of speech module 308 may assign a value of 0 for the part of speech score in step 508. It may be appreciated that in other embodiments, part of speech module 308 could determine if the part of speech label is a noun, pronoun, or other label associated with the subject of a sentence or phrase.

The part of speech module operates to assign a non-zero score to data elements that are subjects of a phrase or sentence, as most forms of sensitive data will consist of subject information, describing a person (such as a name), a place (such as an address), or a thing (such as a social security number). In other embodiments, however, it may be reasonable to consider other part of speech labels when trying to filter out likely sensitive data. In such cases, an algorithm could consider whether or not the part of speech label for a given data element belongs to any predetermined subset of all possible part of speech labels, and assign an appropriate score.

As already discussed, the embodiments provide methods for considering the context of a data element (or term) within the broader context of a corpus of documents as well as within the context of expected key terms in any data that may include sensitive data. This context can be evaluated using a vector space model. When using a vector space model, data can be tokenized and then represented as a vector in a vector space using a suitable method for converting terms into vectors. Once all terms have been converted to appropriate vectors, the distance or similarity of each term can then be compared to other key terms, documents, or other text. Specifically, known methods for comparing vectors in a vector space can be used. Exemplary methods include Euclidean distance and cosine distance.

Figure 6:
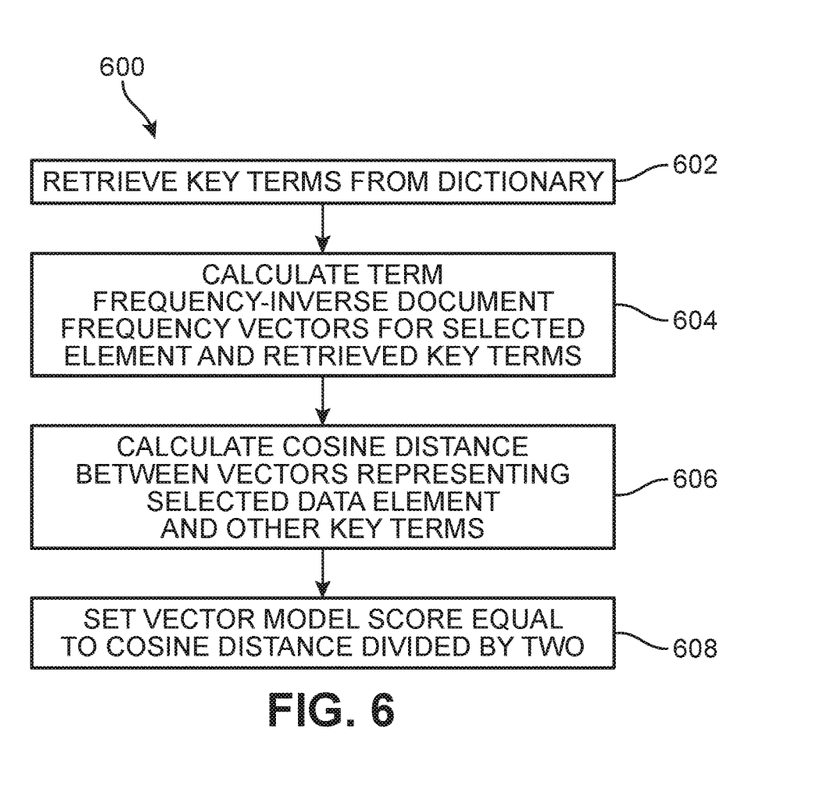
FIG. 6 is a schematic view of a process for assigning a vector model score to a data element, according to an embodiment.

FIG. 6 is a schematic view of a process 600 for determining a part of speech score for a selected data element. In some embodiments, some of the following steps may be performed by a vector space module, such as vector space module 310.

Starting in step 602, vector space module 310 may retrieve key terms from a dictionary. These key terms may be terms that are expected to be present in particular kinds of documents where sensitive data may be present. Next, in step 604, vector space module 310 may convert the selected data element and each of the key terms retrieved in step 602, into vectors that may be associated with a high dimensional vector space. More specifically, in some embodiments, vector space module 310 calculates a set of term frequency-inverse term frequency (tf-idf) weights for the selected element and for each term.

The tf-df weight is calculated for a given term and a given document. The tf-idf weight is calculated as a ratio of the term frequency to the inverse document frequency. The term frequency is a count of how many times the term is used in the selected document for which the weight is being calculated. The inverse document frequency is a measure of whether the term is rare or common across a corpus or set of documents. In some cases, the inverse document frequency may be calculated as the logarithm of the ratio of the total number of documents in the corpus to the number of documents in which the term is used. The tf-idf is then simply a product of the term frequency and the inverse document frequency.

Figure 7:
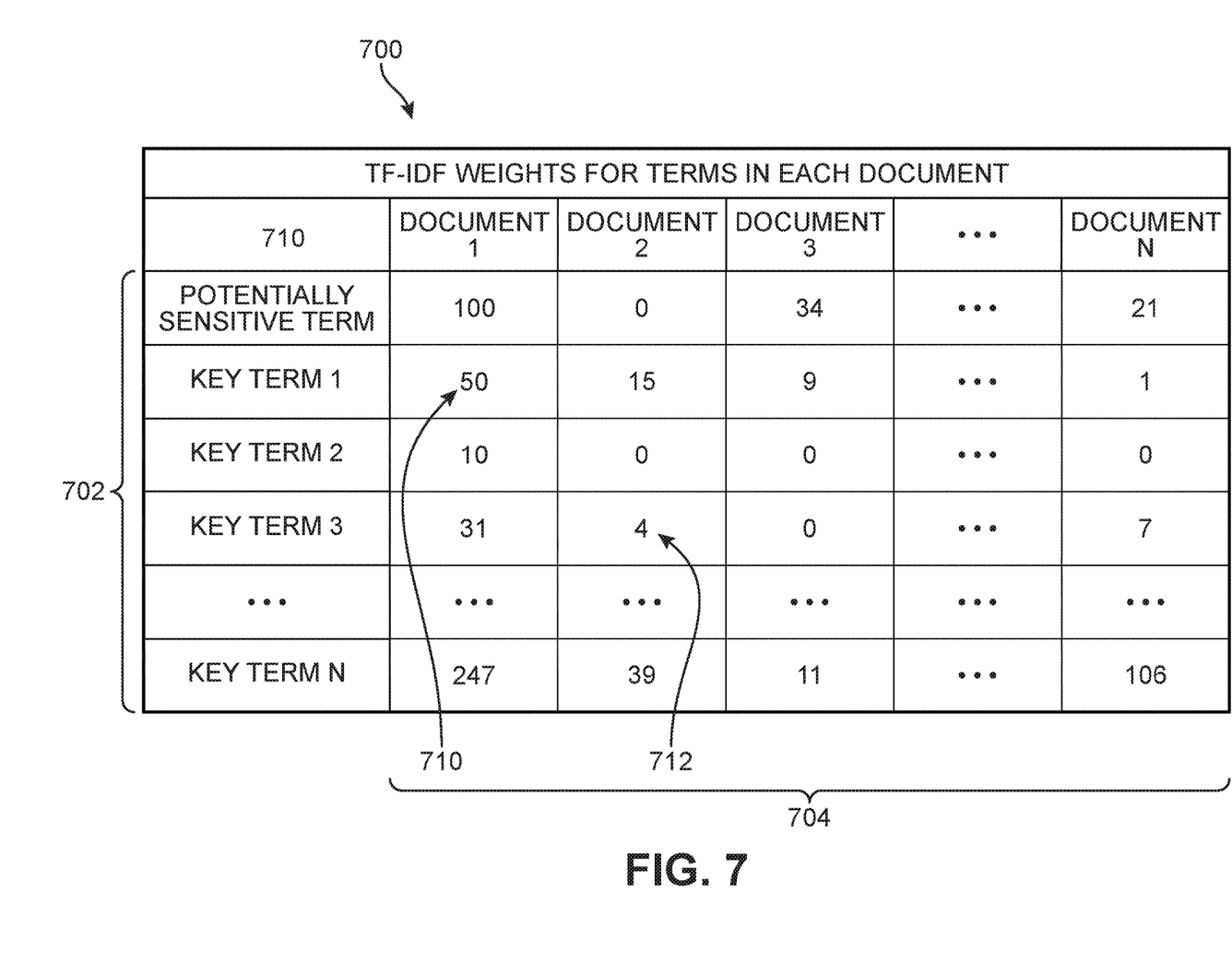
FIG. 7 is a schematic view of a table representing weights for terms in documents, according to an embodiment.

In one embodiment, for each term, a td-idf weight can be computed for each document in the set of documents being scanned. Thus, for each document in a collection (or corpus) of documents, vector space module 310 computes a separate tf-idf weight. This yields a vector for a term where each weight gives the component of that vector along a given axis of the vector space. As a specific example, FIG. 7 shows an exemplary table 700 of td-idf weights that have been computed for a set of terms (listed in column 702) and a set of documents (listed in row 704). That is, each value represents the tf-idf weight determined for a given term (the row) in a given document (the column). For example, a weight 710 in the table has been determined by computing the tf-idf statistic for Key Term 1 relative to Document 1. Likewise, a weight 712 in the table has been determined by computing the tf-idf statistic for Key Term 3 relative to Document 2.

Thus, the table in FIG. 7 can be seen as representing two possible sets of vectors: (1) a set of (row) vectors for each term, whose components are calculated relative to the documents in a collection, or (2) a set of (column) vectors for each document, whose components are calculated relative to the terms.

In step 606, the vector representing the selected data element with potentially sensitive information may be compared with the vectors representing the key terms that were retrieved in step 602. That is, the first vector represented by the first row in FIG. 7 can be compared to the vectors represented by the remaining rows in the table using a suitable metric. In some embodiments, vectors may be compared using the cosine distance, also known as the cosine similarity. The cosine distance measures how similar to vectors are in terms of their relative angle. Specifically, the cosine distance (or cosine similarity) is equal to the cosine of the angle formed between two vectors in a given vector space. When comparing the vector for the selected data element with two or more vectors for key terms, the cosine distance between the selected data vector each key term vector can be calculated separately and then summed with an appropriate normalization to ensure the total cosine distance does not exceed 1.

In step 608, vector space module 310 may set the vector model score equal to the cosine distance calculated in step 606 divided by two. This is equivalent to setting the vector model score equal to the cosine distance times a normalization factor equal to one half. By using a normalization factor of one half, the module ensures that the vector space model score is never greater than 0.5 (or 50%), and thus, that the total sensitive data score is never greater than 1 (or 100%). In other embodiments, any suitable normalization factor could be used.

The exemplary embodiment uses a weighting such that the part of speech score and the vector model score can each contribute a maximum value of 0.5 to the overall sensitive data score. In other embodiments, however, this weighting can be modified so that the part of speech score can contribute a maximum value that is less than 0.5 or greater than 0.5. In such cases, the maximum value for the vector model score could be adjusted accordingly to ensure the total sensitive data score never exceeds 1. As an example, in another embodiment the part of speech score could have a maximum value of 0.4, and the vector model score could be normalized to contribute a maximum value of 0.6, so that the sensitive data score has a maximum of 1.

Figure 8:
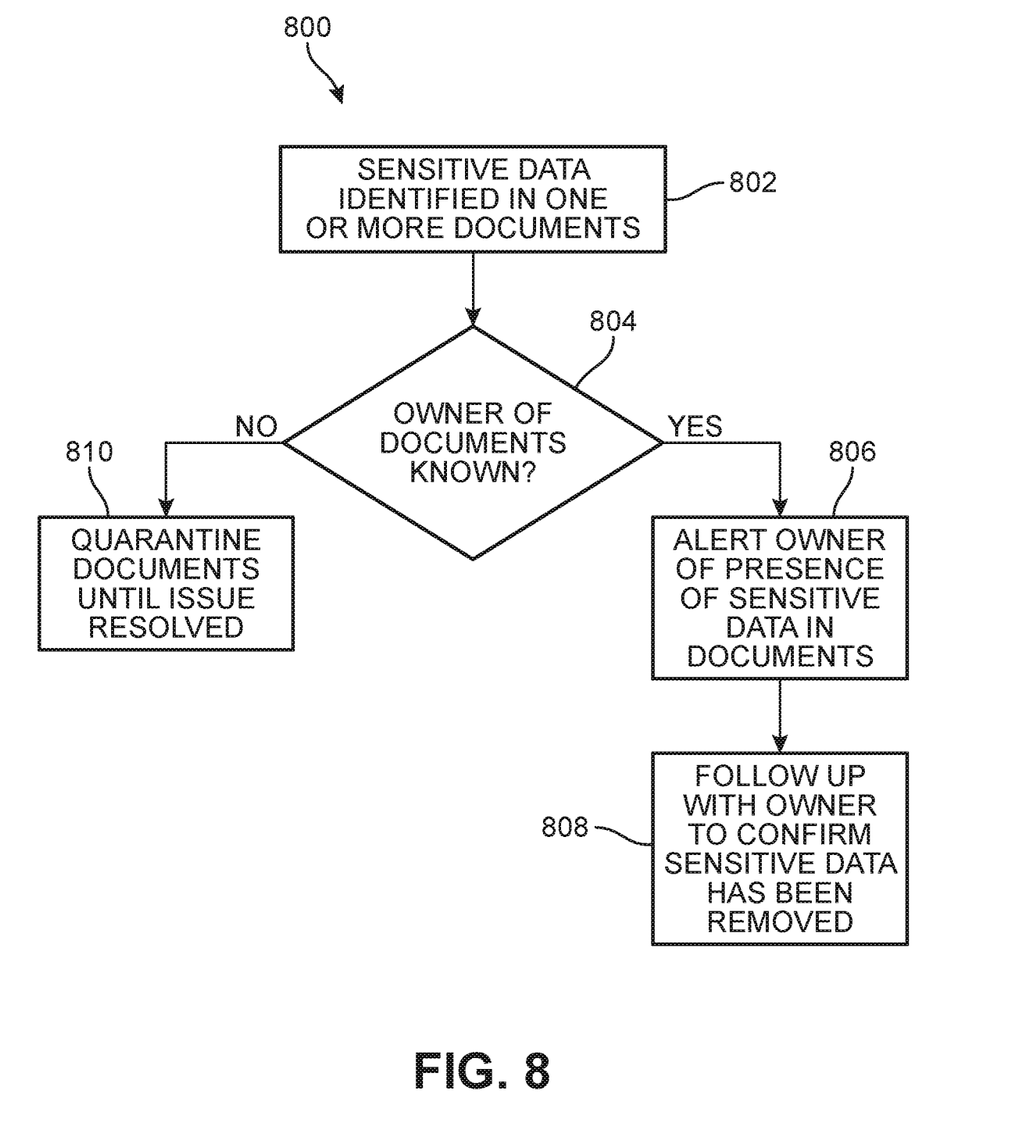
FIG. 8 is a schematic view of a process of taking action when it is determined that a document contains sensitive information, according to an embodiment.

FIG. 8 is a schematic view of a process 800 for taking a mitigating action when sensitive data is found in a document. In some embodiments, the following steps could be performed by a sensitive data mitigation module, such as sensitive data mitigation module 312.

Process 800 begins at step 802, when sensitive data mitigation module 312 learns that sensitive data has been identified in one or more documents. In step 804, sensitive data mitigation module 312 determines if the owner(s) of the documents containing sensitive data are known. If so, the module proceeds to step 806 to alert the owner(s) that sensitive data has been discovered in particular documents. Presumably, once alerted, the data owner would attempt to remove, redact or encrypt the sensitive data (or the entire document). In an optional step 808, the module could follow up with the owner at a later time (by sending a follow-up alert) to confirm the sensitive data has been removed, redacted, or encrypted.

If the owner(s) of the document is not known, sensitive data mitigation module 312 may proceed from step 804 to step 810. In step 810, any documents with sensitive data can be quarantined until the issue is resolved. In some cases, quarantining is accomplished by encrypting the data. In other cases, quarantining is accomplished by moving the data to a more secure data storage system that is at significantly less risk for a data breach than the system where the documents currently reside.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, python, java, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A computer implemented method for transferring sensitive data, comprising executing on a processor the steps of:
   receiving documents stored in a first data storage system;
   scanning the documents and identifying sensitive data within a document by:
   identifying a matching data element in the document;
   retrieving at least one key term, wherein the at least one key term is a term associated with documents including sensitive data;
   using a vector space model to represent the matching data element as a first vector and to represent the at least one key term as a second vector;
   calculating a difference between the first vector and the second vector;
   determining a vector similarity score using the calculated difference between the first vector and the second vector;
   determining a sensitive data score using at least the vector similarity score;
   retrieving a threshold score;

identifying the matching data element as comprising sensitive data by determining that the sensitive data score is greater than or equal to the threshold score;

transferring the document with the matching data element to a second data storage system that is at a lower risk for a data breach than the first data storage system;

wherein calculating the difference between the first vector and the second vector includes taking a cosine distance between the first vector and the second vector;

wherein the vector similarity score is equal to the cosine distance times a normalizing factor; and wherein the normalizing factor has a value of one half.

2. The method according to claim 1, wherein the method includes calculating a part of speech score for the matching data element.

3. The method according to claim 2, wherein determining the sensitive data score includes using the vector similarity score and the part of speech score.

4. The method according to claim 3, wherein determining the sensitive data score includes summing the vector similarity score and the part of speech score.

5. The method according to claim 2, wherein the method further includes determining a part of speech label for the matching data element, wherein the part of speech score is greater than zero when the part of speech label is associated with the subject of a sentence, and wherein the part of speech score is zero when the part of speech label is not associated with the subject of a sentence.

6. The method according to claim 2, wherein the method further includes determining a part of speech label for the matching data element, wherein the part of speech score is greater than zero when the part of speech label is a noun, and wherein the part of speech score is zero when the part of speech label is not a noun.

7. The method according to claim 1, wherein the method further includes alerting an owner of the document including the matching data element that the document includes sensitive data.

8. The method according to claim 1, wherein the method further includes encrypting the document.

9. The method according to claim 1, wherein the vector space model includes a plurality of vectors corresponding to a plurality of key terms, and wherein the vector similarity score uses the difference between the first vector and each of the plurality of vectors.

10. The method according to claim 1, wherein the first vector and the second vector are determined by calculating a set of term frequency-inverse document frequency weights for a set of documents including the document.

11. A system, comprising:
a processor; and
a non-transitory computer readable medium storing instructions executable by the processor to:
receive documents stored in a first data storage system;
scan the documents and identify sensitive data within a document by:
  identifying a matching data element in the document;
  retrieving at least one key term, wherein the at least one key term is a term associated with documents including sensitive data;
  using a vector space model to represent the matching data element as a first vector and to represent the at least one key term as a second vector;
  calculating a difference between the first vector and the second vector;
  determining a vector similarity score using the calculated difference between the first vector and the second vector;
  determining a sensitive data score using at least the vector similarity score;
  retrieving a threshold score;
  identifying the matching data element as comprising sensitive data by determining that the sensitive data score is greater than or equal to the threshold score;
transfer the document with the matching data element to a second data storage system that is at a lower risk for a data breach than the first data storage system;
wherein calculating the difference between the first vector and the second vector includes taking a cosine distance between the first vector and the second vector;
wherein the vector similarity score is equal to the cosine distance times a normalizing factor; and
wherein the normalizing factor has a value of one half.

12. The system according to claim 11, wherein the instructions are further executable to calculate a part of speech score for the matching data element.

13. The system according to claim 12, wherein the instructions are further executable to determine the sensitive data score using the vector similarity score and the part of speech score.

14. The system according to claim 13, wherein the instructions are further executable to determine the sensitive data score by summing the vector similarity score and the part of speech score.

15. The system according to claim 12, wherein the instructions are further executable to determine a part of speech label for the matching data element, wherein the part of speech score is greater than zero when the part of speech label is associated with the subject of a sentence, and wherein the part of speech score is zero when the part of speech label is not associated with the subject of a sentence.

16. The system according to claim 12, wherein the instructions are further executable to determine a part of speech label for the matching data element, wherein the part of speech score is greater than zero when the part of speech label is a noun, and wherein the part of speech score is zero when the part of speech label is not a noun.

17. The system according to claim 11, wherein the instructions are further executable to alert an owner of the document including the matching data element that the document includes sensitive data.

18. The system according to claim 11, wherein the instructions are further executable to encrypt the document.

19. The system according to claim 11, wherein the vector space model includes a plurality of vectors corresponding to a plurality of key terms, and wherein the vector similarity score uses the difference between the first vector and each of the plurality of vectors.

20. The system according to claim 11, wherein the instructions are further executable to determine the first vector and the second vector by calculating a set of term frequency-inverse document frequency weights for a set of documents including the document.

* * * * *